United States Patent
Hudson et al.

(10) Patent No.: US 10,228,057 B2
(45) Date of Patent: Mar. 12, 2019

(54) CIRCUMFERENTIAL DEBRIS SEAL FOR PINNED JOINTS

(71) Applicant: Caterpillar Inc., Peoria, IL (US)

(72) Inventors: Charles Taylor Hudson, Decatur, IL (US); Sunil I. Mathew, Peoria, IL (US); Pradeep Chapagain, Peoria Heights, IL (US)

(73) Assignee: Caterpillar Inc., Deerfield, IL (US)

( * ) Notice: Subject to any disclaimer, the term of this patent is extended or adjusted under 35 U.S.C. 154(b) by 520 days.

(21) Appl. No.: 14/952,026

(22) Filed: Nov. 25, 2015

(65) Prior Publication Data

US 2017/0146126 A1    May 25, 2017

(51) Int. Cl.
```
F16J 15/10    (2006.01)
F16C 11/04    (2006.01)
F16C 33/78    (2006.01)
F16J 15/12    (2006.01)
F16C 11/06    (2006.01)
```

(52) U.S. Cl.
CPC ........... F16J 15/102 (2013.01); F16C 11/045 (2013.01); F16C 11/0614 (2013.01); F16C 33/78 (2013.01); F16J 15/122 (2013.01)

(58) Field of Classification Search
CPC . F16C 11/045; F16C 11/0614; F16C 11/0666; F16C 11/0671; Y10T 403/32861; Y10T 403/32918; Y10T 403/32926; Y10T 403/32819; Y10T 403/32934
See application file for complete search history.

(56) References Cited

U.S. PATENT DOCUMENTS

| | | | | |
|---|---|---|---|---|
| 2,613,091 A | * | 10/1952 | Funnell | B60B 35/003 384/396 |
| 2,628,870 A | * | 2/1953 | Hickman | B60G 9/00 384/424 |
| 2,943,646 A | * | 7/1960 | Thatcher | D03D 49/38 139/151 |

(Continued)

FOREIGN PATENT DOCUMENTS

| | | | |
|---|---|---|---|
| EP | 0 874 171 | * 10/1998 | F16C 11/04 |
| EP | 2199120 B | 9/2011 | |

(Continued)

*Primary Examiner* — Michael P Ferguson
(74) *Attorney, Agent, or Firm* — Leydig, Voit & Mayer, LTD.

(57) ABSTRACT

A self-adjusting seal for sealing a joint. The joint includes a support member, a mis-alignable component, and a changeable gap between the support member and the mis-alignable component. The seal includes a first part having a generally annular configuration formed of a resiliently crushable material and defining a planar outer seal face to statically seal to the support member and a first seal part opening extending therethrough. A second seal part axially adjoins the first part. The second seal part has a generally annular configuration formed of a rigid material and a second seal part opening extending therethrough in axial alignment with the first seal part opening. The first and second seal part openings define a non-rotation feature to prevent rotation of the seal on the support member, the second seal part defining a planer inner seal face configured to dynamically and sealingly interface with the mis-alignable component.

20 Claims, 6 Drawing Sheets

(56) References Cited

U.S. PATENT DOCUMENTS

| | | | | |
|---|---|---|---|---|
| 3,152,846 A | * | 10/1964 | Dumpis | B62D 7/16 384/220 |
| 3,300,230 A | * | 1/1967 | Spencer | B62D 7/18 280/93.512 |
| 3,923,349 A | * | 12/1975 | Herbst | F16C 11/0614 384/215 |
| 4,252,330 A | | 2/1981 | Crow | |
| 5,209,596 A | * | 5/1993 | Matczak | F16C 11/0614 403/134 |
| 5,313,916 A | * | 5/1994 | Murphy | F01L 1/183 123/90.39 |
| 5,407,284 A | | 4/1995 | Vinciguerra et al. | |
| 5,597,172 A | | 1/1997 | Maiwald et al. | |
| 5,904,107 A | | 5/1999 | Kester | |
| 5,975,547 A | * | 11/1999 | Stroh | B62D 7/18 280/93.512 |
| 6,923,462 B2 | | 8/2005 | Tantius | |
| 8,801,318 B2 | | 8/2014 | Knoble et al. | |
| 2007/0267259 A1 | | 11/2007 | Furman et al. | |
| 2008/0309040 A1 | | 12/2008 | Sprock et al. | |
| 2012/0171017 A1 | * | 7/2012 | Norem | F02C 7/277 415/122.1 |
| 2012/0286477 A1 | | 11/2012 | Klousia et al. | |
| 2014/0319905 A1 | | 10/2014 | Mathew et al. | |

FOREIGN PATENT DOCUMENTS

| | | | | |
|---|---|---|---|---|
| FR | 2 680 967 | * | 3/1993 | A61F 2/42 |
| GB | 1021358 A | | 3/1966 | |

\* cited by examiner

CIRCUMFERENTIAL DEBRIS SEAL FOR PINNED JOINTS

TECHNICAL FIELD

This disclosure relates generally to seals and, more particularly, to debris seals for joints such as pinned joints.

BACKGROUND

The operation of machinery in dusty environments can present challenges. One such challenge is protection of machine bearings from effects of dust and debris. Off-highway trucks, for example, are especially susceptible to bearing contamination due to the presence of high concentrations of dirt, water, and other contaminants in the working environment of the trucks.

One bearing type that is susceptible to contamination is the bearing arrangement located in the pinned joints attaching struts and similar components to the truck frame. One reason for this vulnerability is that the strut connects to the frame with an open structure that permits movement of the strut in the joint. One such structure includes a spherical-type bearing.

Spherical-type bearings or joints are commonly used in suspension systems to couple a shock or strut to a part of the machine, such as a control arm, in a fashion that allows the shock or strut to pivot or rotate around one or more axes relative to the control arm. In order to function properly over their service life, spherical bearings may be lubricated and efforts are made to minimize the amount of debris that enters the bearing and collects on internal surfaces, particularly those internal bearing surfaces that rub against one another as the bearing operates. Some spherical bearings types do not require lubrication. In those bearing types, preventing debris from coming into contact with internal bearing and joint surfaces becomes even more important because there is no fluid to contain and remove the debris.

To maintain the operational state of the bearing and minimize the amount of debris that enters the bearing, various attempts have been made in the past to seal the bearing. Some past solutions include bearing seals that entail seating a relatively small lip seal in the outer race of the bearing so that the seal rides on the ball or inner race as the bearing operates. However, in order to seat within the outer race, the lip seal must be relatively small, which tends to reduce the effectiveness of the seal. Moreover, such seals tend to fall off the edge of the ball or inner race and become crushed when the pin of the bearing moves into a maximum rotational position.

Other past solutions provide a type of flexible covering or boot over the entire bearing. Although such a covering may reduce the amount of debris that enters the bearing, it generally does effectively retain the lubrication within the internal structures of the bearing. Moreover, such a covering may not be appropriate for certain applications and may make visual inspections, repair, and routine maintenance of the bearing more difficult. In addition, in order to properly seal the bearing, such coverings or boots are often assembled tightly around one or more parts of the bearing and/or the components coupled to the bearing. If the different components to which the boot is coupled move relative to one another, particularly if they rotate relative to one another, the tight fit of the boot against each component causes different portions of the boot to move relative to one another, which may cause the boot to twist or wrap up and become damaged.

In pinned joints with spherical-type bearings, the strut can move in the joint along the pitch direction, where the strut pivots in a plane normal to the axis of the pin. The strut may also move in the yaw and roll directions in addition to pitch. The misalignment of parts produced by movement in the yaw and roll directions, in particular, requires the provision of a changeable gap between the strut and the support structure to which it is attached. It can be difficult to prevent contamination from entering through the gap, into the joint, and into a bearing supporting the strut on the frame.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a self-adjusting seal for sealing a joint. The joint includes a support member, a mis-alignable component, and a changeable gap between the support member and the mis-alignable component. The seal includes a first part having a generally annular configuration formed of a resiliently crushable material and defining a planar outer seal face to statically seal to the support member and a first seal part opening extending therethrough. A second seal part axially adjoins the first part. The second seal part has a generally annular configuration formed of a rigid material and a second seal part opening extending therethrough in axial alignment with the first seal part opening. The first and second seal part openings define a non-rotation feature to prevent rotation of the seal on the support member, the second seal part defining a planer inner seal face configured to dynamically and sealingly interface with the mis-alignable component.

Another aspect of the disclosure provides a joint for a machine, including a support structure formed on the machine. The support structure includes a boss. A pin has a longitudinal axis and is disposed on the support structure. A spherical bearing assembly is disposed about the pin. A mis-alignable component is movably disposed on the spherical bearing, the mis-alignable component defining at least one changeable gap with the support structure and a self-adjusting seal is mounted on the support structure and about the boss to seal the changeable gap. The seal includes a first part having a generally annular configuration formed of a resiliently crushable material and defining a planar outer seal face to statically seal to the support member and a first seal part opening extending therethrough. A second seal part axially adjoins the first part. The second seal part has a generally annular configuration formed of a rigid material and a second seal part opening extending therethrough in axial alignment with the first seal part opening. The first and second seal part openings define a non-rotation feature to prevent rotation of the seal on the support member, the second seal part defining a planer inner seal face configured to dynamically and sealingly interface with the mis-alignable component.

Other aspects of the disclosure provide wherein the first seal part may be formed of open cell polyurethane. The second seal part may be formed of a metal material. The inner seal face of the second seal part may include a low-friction material. The low-friction material may be PTFE. The second seal part may include an inner layer of rigid material and an outer layer of PTFE axially adjoining the inner layer. The second seal part may be formed of a composite material. The composite material may be fiber reinforced plastic. The PTFE may be one of a layer of low-friction material and embedded in the composite material. The non-rotation feature may include a rounded portion and a rectangular portion extending radially from the rounded portion. The first and second seal parts each may include an outer periphery and a flat formed on the outer periphery, wherein the flat of the first seal part is aligned with the flat of the second seal part. The self-adjusting seal may be disposed between the support structure and the mis-alignable component in a compressed state to permit the seal to expand to fill the changeable gap when the changeable gap widens. The self-adjusting seal may be axially compressed about 5 percent to about 20 percent.

Further and alternative aspects and features of the disclosed principles will be appreciated from the following detailed description and the accompanying drawings. As will be appreciated, the principles related to seals for a pinned joint as disclosed herein are capable of being carried out in other and different embodiments, and capable of modification in various respects. Accordingly, it is to be understood that both the foregoing general description and the following detailed description are exemplary and explanatory only and do not restrict the scope of the appended claims.

DETAILED DESCRIPTION

Figure 1:
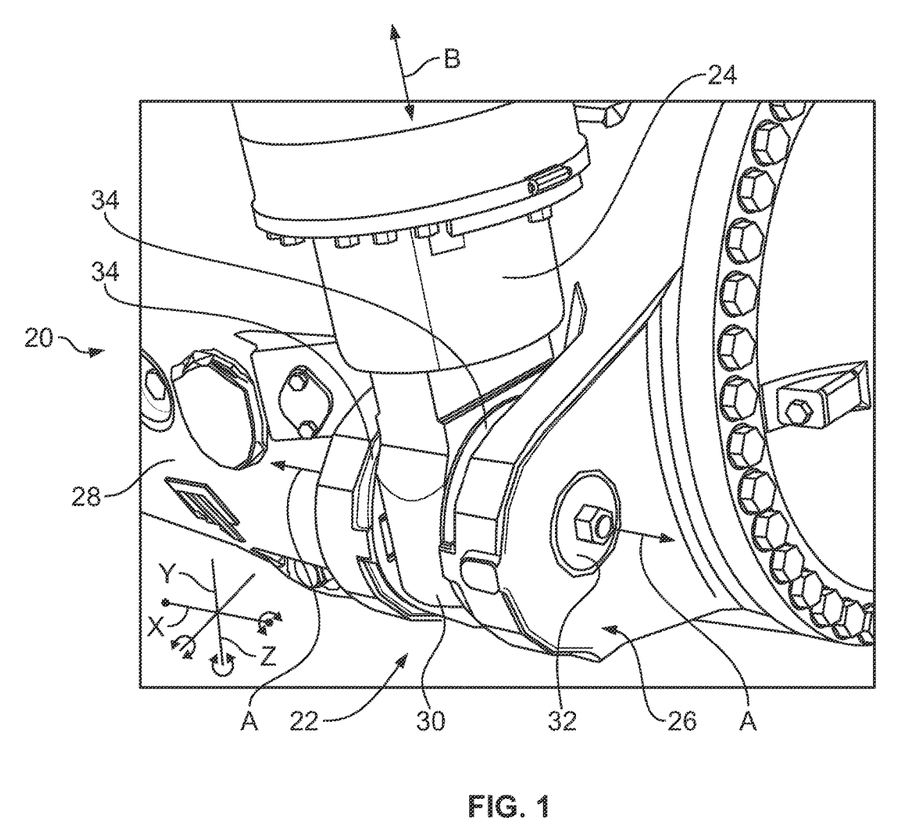
FIG. 1 is a portion of a perspective view of an exemplary machine including a pinned joint with a strut attached to a support structure of a machine frame.

FIG. 1 is a portion of an exemplary machine 20 including a pinned joint 22 with a strut 24, or a similar device, attached to a support structure 26 of the machine. The support structure 26 may be formed on the machine frame (not shown) or a part 28 of the machine. In the illustrated embodiment, the part 28 of the machine illustrated herein houses the running gear portions of the machine, but the sealing arrangements shown herein have additional applications in different portions of the machine, or in different machines.

The machine 20 may be any machine, such as a truck, that includes a strut 24, or the like, connected at one end to the support structure 26 and at the other end to the frame (not shown) of the machine. The strut 24 is a dynamic component, i.e., a component that is movable during operation relative to the support structure 26.

The joint 22 includes the support structure 26, which may be a clevis-shaped joint with double ears, and an attached strut 24, which may also be any mis-alignable, dynamic component. The strut 24 may be a conventional strut or a shock absorber. While a strut is shown to provide context to the structure of the joint 22 and the components associated with the joint, it will be understood that any mis-alignable part could be substituted therefor, such as a control arm, a suspension component, a steering mechanism component, a stabilizer, a bar, and the like.

A pair of seals 34, according to embodiments of the disclosure, is provided in the joint 22. Each seal of the pair of seals is disposed respectively on opposite sides of the strut 24 to seal between the support structure 26 and strut 24. The joint 22 is shown with the lower part 30 of the strut 24 connected to the support structure 26. It will be understood that the upper part of the strut 24 (not shown) may be attached to the machine 20 in a similar fashion. The strut 24 is held in the support structure 26 by a pin 32. The pin 32 has a pin axis "A" that extends along a longitudinal dimension of the pin 32.

The construction of the joint permits motion between the strut 24 and the support structure 26. Specifically, the strut 24 is pivotally mounted on a spherical bearing (see FIG. 5), which is disposed about pin 32 to permit the strut to rotate about axis A. The rotation axis of the spherical bearing around the pin axis A is denoted as the "X" axis. An axis along a longitudinal dimension of the strut is denoted as the "B" axis, as shown in FIG. 1. The motion about the X axis may be considered a pitch motion, which is in a plane normal to the X axis. The strut 24 may also twist about or deviate from the strut axis "B" to produce either a roll motion about the B axis or a yaw motion out of the pitch motion plane. When the strut 24 rotates about or deviates from the B axis, the axis of the bore (not shown) of the lower part 30 of the strut 24 becomes misaligned with the axis A of the pin 32. The misalignment causes a difference in the alignment and gap between the strut lower part 30 and the support structure 26 of the joint 22. The seal 34 adapts or self-adjusts to the misalignment to reject the entry of contamination in the misaligned state.

Figure 2A:
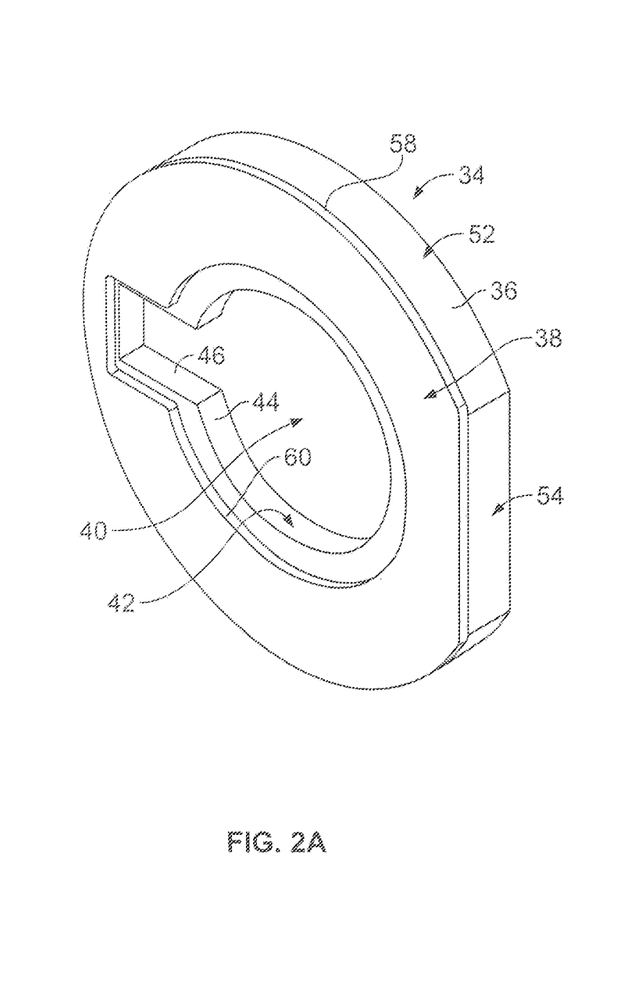
FIG. 2A is a perspective view of a first embodiment of a seal for the pinned joint of FIG. 1.
Figure 2B:
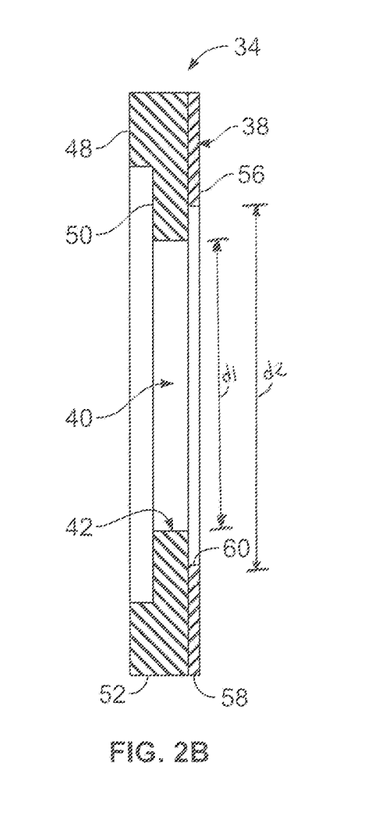
FIG. 2B is a cross section view of the seal of FIG. 2A.

FIG. 2 shows a first embodiment of a seal 34 that accommodates the misalignment of the strut lower part 30 and the support structure 26 of the joint 22, to maintain a sealing engagement between the strut lower part and the support structure. The seal 34 includes two main parts: a first seal part 36, which is elastomeric, compressible and generally annularly-shaped, and a second seal part 38, which is attached to the first seal part. The second seal part 38 is less compressible than the first seal part 36 and is similar in shape to the first seal part. The first seal part 36 operates statically, i.e., the first seal part 36 presents a non-dynamic interface. The second seal part 38 is designed to operate dynamically, which is meant herein to indicate an operating condition of the seal part in which the second seal part 38 presents a dynamic interface that permits relative movement of a part in contact with the second seal part 38.

The first seal part 36 of the seal 34 is generally annular and includes a first seal part opening 40 formed axially therethrough that has a non-rotation feature 42. The non-rotation feature 42 may have a keyhole configuration with a rounded portion 44, one side of which forms a rectangular extension 46 of the rounded portion.

The first seal part 36 is formed of a resiliently crushable material. The resiliently crushable material may be a compressible elastomeric material, which may be open-cell foam or semi-open cell foam material. One example of a suitable compressible elastomeric material is polyurethane having a density of about 300 to 650 kg/m$^3$.

The outer face 48 of the first seal part 36 is flat or planar and may include a counterbore 50 that has a shape similar to the non-rotation feature 42, but with a greater diameter. The outer periphery 52 of the first seal part 36 may include a flat 54, which cooperates with the non-rotation feature 42 to orient the seal 34 by cooperative engagement with corresponding structures (see FIG. 4) on the support structure 26.

The second seal part 38 of the seal 34 is formed of a harder material that is relatively less flexible and less compressible than the material that makes up the first seal part 36. For example, the second seal part 38 may be formed of a metal such as steel, or like materials, or a composite material such as fiberglass, glass filled nylon, carbon reinforced plastic, and the like. The second seal part 38 includes an inner face 56 that is flat or planar and is at least partially made from low friction materials, includes low-friction coatings, or is shaped with a smooth surface finish to provide relatively low friction properties. One embodiment of an inner face 56 with low friction properties can be provided by forming a layer or coating of a low friction material, such as PTFE, on the inner face, or providing the second seal part 38 with an effective amount of embedded PTFE. Embedding the PTFE can be provided in a cloth matrix added to the composite version, such as a layer of scrim. Any suitable low friction substance is contemplated.

The shape of the second seal part 38 is similar to the first seal part 36 in that it is generally annular with a generally rounded periphery 58 that has a common extent or boundary with the outer periphery 52 of the first seal part. The second seal part 38 has a second seal part central opening 60 in the shape of a keyhole similar to that of the non-rotation feature 42 of the first seal part 36. The second seal part 38 forms a central opening 60, which may have a greater diameter (see FIG. 2B where distance d2>d1 measured in the same direction) than the corresponding non-rotation feature 42 of the first seal part. In an installed configuration, each seal 34 is oriented such that the outer face 48 of the first seal part is adjacent to the support structure, and the inner face 56 of the second seal part 38 is adjacent the strut 24.

Figure 6:
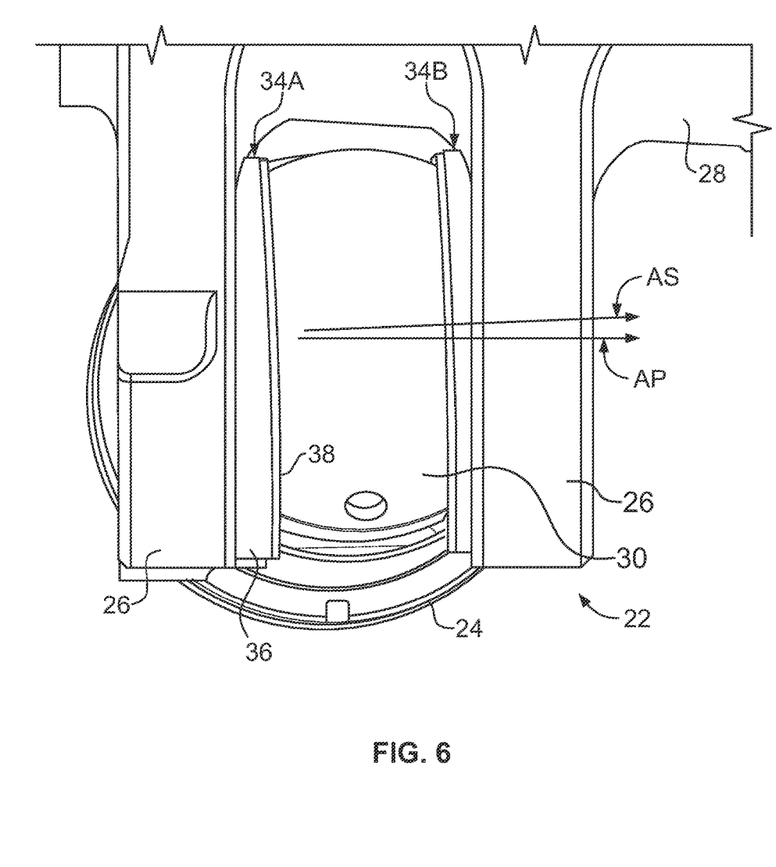
FIG. 6 is a bottom view of the pinned joint of FIG. 1 and the seal of FIG. 2 wherein the strut is misaligned with the pin of the joint illustrating the conformance of the seal to the misalignment.

In operation, the first seal part 36 of the seal 34 compresses when a pressure increase on the part that results from the strut 24 becomes misaligned relative to the support structure 26, especially in areas having a relatively smaller gap, i.e., in areas that become pinched, which includes areas on the top left and bottom right in the orientation of structures shown in FIG. 6. Conversely, the seal 34 expands in response to a reduction in pressure from the strut in areas of a larger gap, or areas that are pulled apart, as also shown in FIG. 6. The second seal part 38 of the seal 34 tends to stay aligned and in contact with the strut 24 regardless of alignment of the strut and the changeable gap and permits the strut to pivot about pin 32 easily due to the low friction provided between these components, as described above.

During operation, the seal 34 can compress and expand when it is installed in a pre-compressed state. For example, the seal 34 can be installed when the seal is compressed or pre-crushed by nine (9) or more millimeters (mm). The pre-compression of the elastomeric or elastic seal material permits the seal material to elastically expand and accommodate a change in the space between the strut 24 and the support structure 26 by about 7 millimeters. In other words, the seal 34 can be compressed about 30-40 percent (%) installed, so it can elastically adapt to changes in the alignment of the strut 24 in the support structure 26.

Figure 3A:
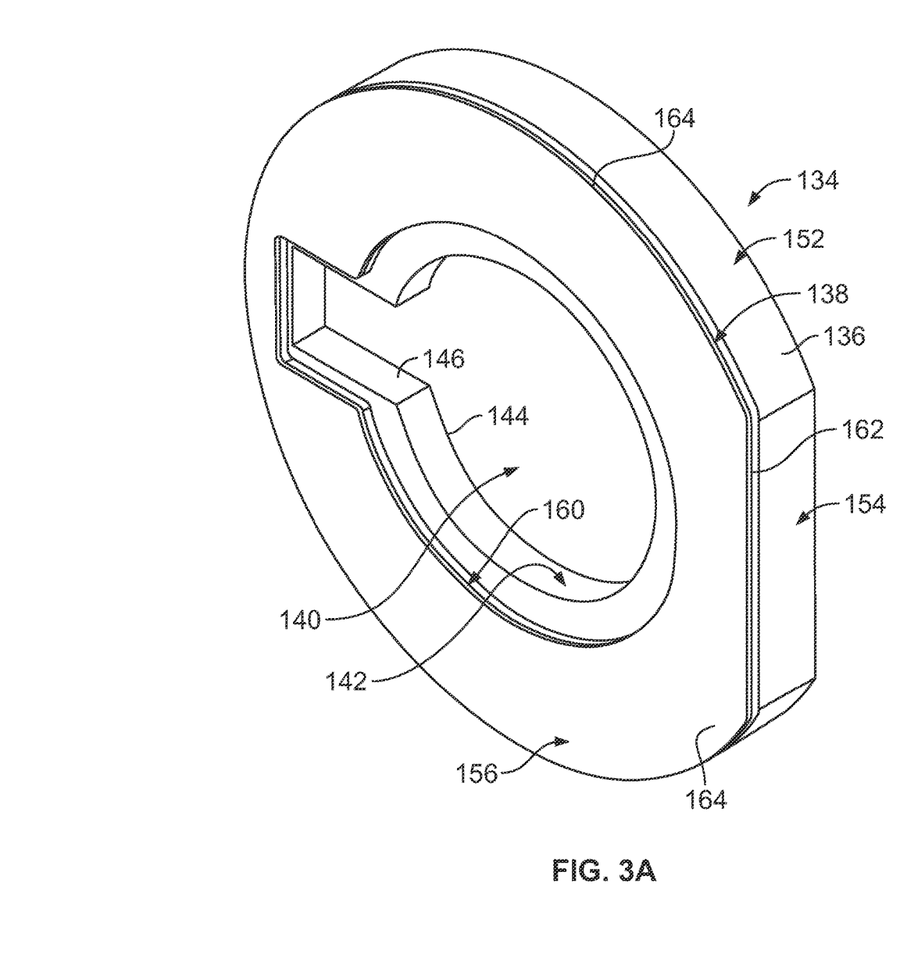
FIG. 3A is a perspective view of a second embodiment of a seal for the pinned joint of FIG. 1.
Figure 3B:
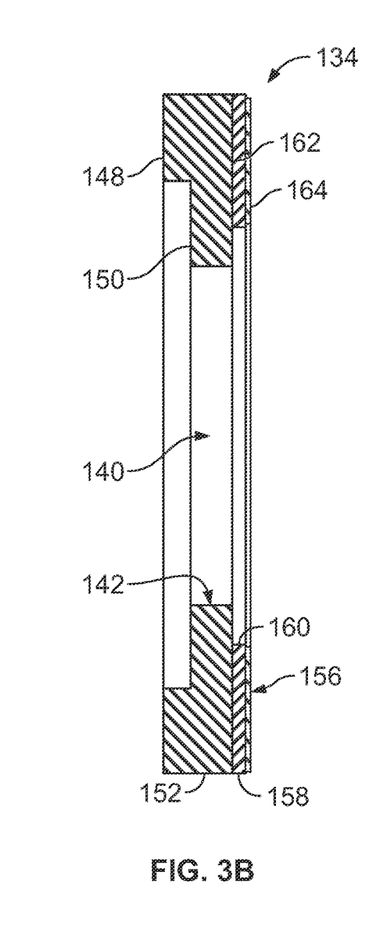
FIG. 3B is a cross section view of the seal of FIG. 3A.

FIGS. 3A and 3B provide a seal 134 similar to the seal 34 described in 2A and 2B, but with a dual layer, second seal part 138 added to the seal. In particular, the seal 134 includes two main parts: a first seal part 136, which is elastomeric, compressible, and generally annular, and a second seal part 138, which is attached to the first seal part. The second seal part 138 is less compressible and is similar in shape to the first seal part 136.

The first seal part 136 of the seal 134 is generally annular and includes a first seal part opening 140 formed therethrough that has a non-rotation feature 142. The non-rotation feature 142 may have a keyhole configuration with a rounded portion 144, one side of which is a rectangular extension 146 of the rounded portion, but other shapes can be used.

The first seal part 136 is formed of a compressible elastomeric material, which may be open-cell foam or semi-open cell foam material. One example of a suitable compressible elastomeric material is polyurethane having a density of about 300 to 650 kg/m$^3$.

The outer face 148 of the first seal part 136 may include a counterbore 150 that has a shape similar to the non-rotation feature 142, and a greater diameter than the corresponding internal opening. The outer periphery 152 of the first seal part 136 may include a flat 154 that cooperates with the non-rotation feature 142 to orient the seal 134 by cooperative engagement with corresponding structures (see FIG. 4) on the support structure 126.

The second seal part 138 of the seal 134 is formed of two layers of material. The inner layer 162 is made or formed from a harder material that is less flexible than the first seal part 136. For example, the inner layer or support portion 162 of the second seal part 138 may be formed of a metal such as steel, or like materials, or a composite material such as fiberglass, glass filled nylon, carbon reinforced plastic, and the like. The outer layer 164 of the second seal part 38 includes an inner face 156 that may be formed of, or at least include a portion or a coating formed using a low friction material. One embodiment of inner face 156 includes a low friction material, such as PTFE. Any suitable low friction substance is contemplated.

The shape of the second seal part 138 is similar to the shape of the first seal part 136 in that it is generally annular with a generally rounded periphery 158 that has a common extent or boundary with the outer periphery 152 of the first seal part 136. The second seal part 138 has a second seal part central opening 160 that is formed in the shape of a keyhole that corresponds to the shape of the non-rotation feature 142 of the first seal part 136. The second seal part central opening 160 may be of a greater diameter than the non-rotation feature 142 of the first seal part. In an installed configuration, each seal 134 is oriented such that the outer face 148 of the first seal part is adjacent the support structure and the inner face 156 of the second seal part 138 is adjacent the strut 24.

Figure 4:
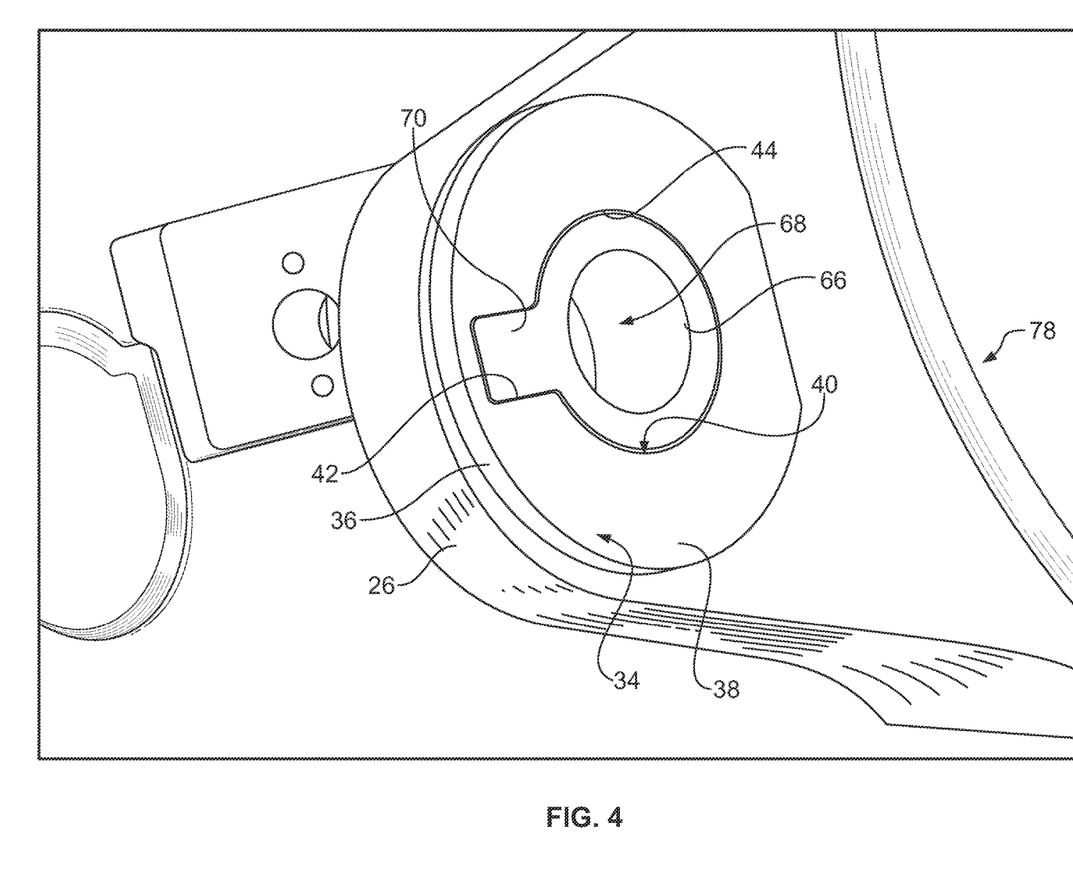
FIG. 4 is a perspective view of a seal disposed on a support structure of the machine frame.

FIG. 4 shows part of the support structure 26, i.e., one ear of a clevis type structure, with a seal 34 in position. Specifically, the support structure 26 includes a boss 66 attached to the support structure. The boss 66 includes a bore 68 formed therethrough. The bore 68 is sized and oriented to receive the pin 32 (see FIG. 1 and FIG. 5). The boss 66 includes a lug 70. The lug 70 can be configured to limit the maximum misalignment of the strut 24.

The seal 34 fits around the boss 66 and lug 70 with the rounded portion 44 of the first seal part opening 40 positioned around the boss and the non-rotation feature 42 positioned over the lug 70. The first seal part 36 of the seal 34 is positioned adjacent the support structure 26 and the second seal part 38 of the seal is positioned such that it may be brought into contact with a strut 24. It will be understood that the thickness of the seal 34 can be greater than the thickness of the boss 66 and, therefore, stands proud of the boss by a predefined distance or height. The structure of the support structure 26 illustrated herein requires a corresponding, matching second ear of a clevis type structure provided with a corresponding seal 34 to provide the sealing of the entire joint 22 (see FIG. 5).

Figure 5:
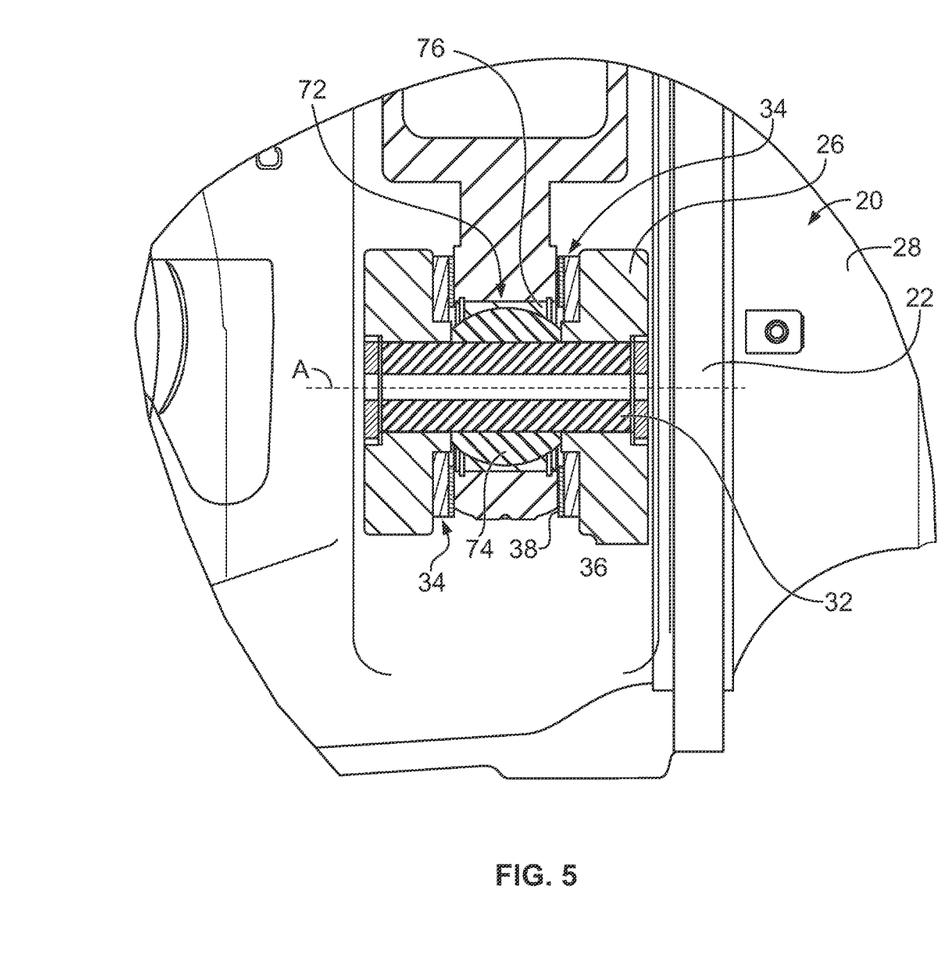
FIG. 5 is a cross section view of the pinned joint of FIG. 1 and the seal of FIG. 2 with the strut aligned with the pin of the joint.

FIG. 5 shows the joint 22, with the seals 34, strut 24, support structure 26, and associated elements in cross section. The joint 22 includes a spherical bearing assembly 72 disposed within the lower part 30 of the strut 24, and is mounted about the pin 32 to moveably support the strut and retain the same in a centered position within, and also in engaged relation with, the support structure 26. The spherical bearing assembly 72 includes a convex portion 74 disposed on the pin 32, and a concave portion 76 movably disposed about the convex portion and adjacent the strut lower part 30.

Seals 34 are sealingly interposed between the support structure 26 and the strut lower part 30. The seals 34 are kept in abutting, sealing contact with the spherical bearing assembly 72. The first seal part 36 of each seal 34 is adjacent a support structure 26 to provide the static interface therebetween. The second seal part 38 of each seal 34 is adjacent the strut 24 to provide a dynamic interface therebetween.

Both the strut lower part 30 and pin 32 share the same axis A in FIG. 5. The seals 34 can react to misalignment of the strut 24 in the joint 22 when the axis of the strut becomes misaligned with the axis of the pin 32. While the pin 32 is held captive in the support structure 26, the strut 24 can move relative to the pin 32. One example of misalignment is illustrated in FIG. 6.

In FIG. 6, the axis of the pin (not shown), which is also the axis of the pinned joint 22, is represented by line AP. The axis of the strut 24 lower end 30 is represented by line AS. In the condition shown, the axis AS is misaligned with the axis AP, to illustrate one exemplary operating condition. In this operating condition, Therefore, the seals 34A, 34B have a changed configuration to accommodate and maintain a sealing engagement between the strut 24 lower end 30 and the support structure 26, such that they continue to discourage the entry of contaminants into the interior of the joint 22 despite the misalignment of the strut 24. In particular, the strut 24 lower part 30 is twisted (in the figure) in the counterclockwise direction. Accordingly, the top (in the figure) of seal 34A is relatively more compressed and the bottom of seal 34A is relatively less compressed compared to an aligned state of the strut 24 in the joint 22. In addition, the top (in the figure) of seal 34B is relatively less compressed and the bottom of seal 34B is relatively more compressed compared to an aligned state of the strut 24 in the joint 22.

INDUSTRIAL APPLICABILITY

The present disclosure is applicable to many machines, for example, off-highway trucks, which are commonly used in construction sites, mines and quarries. Typically, such machines employ a set of struts or shock absorbers attached to a joint including a support structure on the machine. The joint is designed to permit some movement of the strut. The seals disclosed herein are adaptable to seal the joint and protect interior elements of the joint, such as non-lubricated bearings, from contaminants.

Although the disclosed embodiments have been described with reference to a machine with struts, the disclosed embodiments are applicable to any machine having a mis-alignable component attached thereto and the need to exclude debris from a bearing or bushing that supports the mis-alignable component.

It will be appreciated that the foregoing description provides examples of the disclosed devices. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A self-adjusting seal sealing a joint, the joint including a support member including an axially extending boss comprising a bore for receiving a pivot pin, a mis-alignable component comprising a bore pivotally connectable to the support member about the pivot pin, and a changeable gap defined between the support member and the mis-alignable component, the seal comprising:

a first seal part having a flat generally annular configuration formed of a resiliently crushable material and defining a planar outer seal face and a planar inner seal face, the planar outer seal face being configured to statically seal to the support member, and the first seal part further defining a non-circular first seal part opening extending therethrough along a longitudinal axis, the first seal part opening having a first diameter; and a second seal part having a planar inner seal face and a planar outer seal face, the second seal planar outer seal face being disposed adjacent the first seal part planar inner seal face, the second seal part formed of a rigid material, the second seal part having a flat generally annular configuration and defining a non-circular second seal part opening extending therethrough along the longitudinal axis in alignment with the first seal part opening, the second seal part opening having a second diameter, the second diameter being greater than the first diameter, the first and second seal part openings defining a keyhole-shaped non-rotation feature configured to non-rotatably fit on the boss and prevent rotation of the seal on the support member, wherein the non-rotation feature includes a rounded portion and a rectangular portion extending radially from the rounded portion defining the first seal part opening and the second seal part opening, the second seal part planar inner seal face being configured to dynamically and sealingly interface with the mis-alignable component.

2. The seal of claim 1, wherein the first seal part is formed of open cell polyurethane.

3. The seal of claim 1, wherein the second seal part is formed of a metal material.

4. The seal of claim 3, wherein the inner seal face of the second seal part includes a low-friction material.

5. The seal of claim 4, wherein the low-friction material is PTFE.

6. The seal of claim 1, wherein the second seal part includes an inner layer of rigid material and an outer layer of PTFE axially adjoining the inner layer.

7. The seal of claim 1, wherein the second seal part is formed of a composite material.

8. The seal of claim 7, wherein the composite material is fiber reinforced plastic.

9. The seal of claim 7, wherein the inner seal face includes a low-friction material.

10. The seal of claim 9, wherein the low-friction material is PTFE.

11. The seal of claim 10, wherein the PTFE is one of a layer of low-friction material and embedded in the composite material.

12. The seal of claim 1, wherein the first and second seal parts each include an outer periphery and a flat formed on the outer periphery, wherein the flat of the first seal part is aligned with the flat of the second seal part.

13. A machine, comprising:
a support structure including an axially extending boss comprising a bore for receiving a pivot pin;
a pivot pin having a longitudinal axis disposed on the support structure and extending through the bore;
a spherical bearing assembly disposed about the pin;
a mis-alignable component comprising a bore movably disposed on the spherical bearing assembly and pivotally connected to the support structure, the mis-alignable component defining at least one changeable gap with the support structure; and
a self-adjusting seal mounted on the support structure and about the boss to seal the changeable gap, the seal comprising:
a first seal part having a flat generally annular configuration formed of a resiliently crushable material and defining a planar inner seal face and a planar outer seal face contacting the support member and configured to statically seal to the support member, the first seal part defining a non-circular first seal part opening extending therethrough along the longitudinal axis, the first seal part opening having a first diameter; and
a second seal part having a planar inner seal face and an outer seal face, the second planar outer seal face being disposed adjoining the first seal part planar inner seal face, the second seal part having a flat generally annular configuration formed of a rigid material, the second seal part defining a non-circular second seal part opening extending therethrough along the longitudinal axis in alignment with the first seal part opening, the second seal part opening having a second diameter, the second diameter being greater than the first diameter, the first and second seal part openings defining a keyhole-shaped non-rotation feature engagingly cooperating with the boss to prevent rotation of the seal on the support member, the second seal part planar inner seal face contacting the mis-alignable component and configured to dynamically and sealingly interface with the mis-alignable component.

14. The machine of claim 13, herein the second seal part includes one of a metal material and a composite material.

15. The machine of claim 14, wherein the inner seal face includes a low-friction material.

16. The machine of claim 13, wherein the non-rotation feature includes a rounded portion and a rectangular portion extending radially from the rounded portion defining the first seal part opening and the second seal part opening.

17. The machine of claim 13, wherein the first and second seal parts each include an outer periphery and a flat formed on the outer periphery, wherein the flat of the first seal part is aligned with the flat of the second seal part.

18. The machine of claim 13, wherein the self-adjusting seal is disposed between the support structure and the mis-alignable component in a compressed state to permit the seal to expand to fill the changeable gap when the changeable gap widens.

19. The machine of claim 18, wherein the self-adjusting seal is axially compressed about 30 percent to about 40 percent when installed.

20. The machine of claim 18, wherein the first and second seal parts each include an outer periphery and a flat formed on the outer periphery, wherein the flat of the first seal part is aligned with the flat of the second seal part.

* * * * *